3,459,695
ASPHALTIC LAMINATING COMPOSITION
John A. Hedge, Wilmington, and Lewis W. Hall, Jr., Claymont, Del., and Charles Shore, Chadds Ford, Pa., assignors to Sun Oil Company, Philadelphia, Pa., a corporation of New Jersey
No Drawing. Filed Apr. 7, 1966, Ser. No. 540,821
Int. Cl. C08h *13/08;* B32b *15/08*
U.S. Cl. 260—28.5                                     2 Claims

---

ABSTRACT OF THE DISCLOSURE

Hot melt laminating compositions are disclosed which comprise asphalt, atactic propylene-ethylene copolymer containing .5 to 20 weight percent ethylene, an elastomer, and a petroleum mineral oil.

---

The present invention relates to asphaltic laminating compostions and more particularly to asphaltic compositions which are particularly suited for hot melt application and which are superior laminating materials to asphalt.

Asphalt or modified asphaltic compounds are often used as a laminate for cellulosic materials or metal foils. A significant disadvantage of asphalt is its tendency to flow. Straight run asphalt flows slowly at ambient temperature and quite readily at elevated temperatures. Air blown asphalt has greatly reduced flow, but is too hard and brittle at low temperatures for many laminating applications.

Many of the modified asphaltic compounds have some improved properties but do not possess the total improvements of the compositions of the present invention.

Of particular interest is an asphaltic adhesive suitable for laminating extruded polymer sheet material, i.e., polyethylene, polypropylene, polyvinylchloride, etc., to metal pipe. The purpose of laminating the polymer sheet to the metal pipe is to improve the corrosion resistance of the metal pipe. It has been the practice in recent years to employ extruded polymer pipes in place of metal pipes because of their extreme resistance to corrosion. However, such pipes have been found not entirely satisfactory because of a lack of strength. It has been found that by coating metal pipes with thin polymer sheets, i.e., 2–10 mil. tihckness, that essentially the same degree of corrosion resistance could be obtained while maintaining the structural strength inherent in metal pipe. Polymer covered metal pipes have found great utility in permanent and temporary installations above or under ground for the transporting of fluids and gases particularly water. Such pipes also exhibit excellent corrosion resistance to salt water and may be used to transport materials through bodies of salt water.

In order to produce a polymer coated metal pipe which is competitive with polymer extruded pipes as to price and performance, a suitable adhesive for bonding the copolymer sheet to the metal pipe was necessary. Among the criteria to be considered in the selection of an adhesive are cost, ring and ball softening point, penetration, cold flow, hot flow and viscosity. It has been determined that a suitable adhesive will be one having the properties set out in Table I. These properties taken into account not only the performance of adhesive on the bond but also the performance of the adhesive in the laminating process and machinery.

TABLE I

Required physical properties

| | |
|---|---|
| R & B softening point (° F.) | 140–180 |
| Pen., 77° F. (1/10 mm.) | 90–120 |
| Cold flow [1] (in./hr.) | 0–3/16 |
| 160° F. flow [1] (in./hr.) | 0–3 |
| Stormer viscosity | |
| 300° F. 100 rev. (sec.) | 65–140 |
| 270° F. 100 rev. (sec.) | 180–380 |

[1] Corrugated brass plate at 45° angle.

It has been found that the criteria and properties set out above may be obtained in a low cost hot melt laminating composition comprising a homogeneous mixture of an asphalt, an atactic propylene-ethylene copolymer, an elastomer, and a petroleum mineral oil.

The term asphalt as used herein and in the appended claims includes bituminous materials containing asphaltenes or tarry constituents and comprises such bituminous materials as, for example, petroleum residues, pitches, road oils, albino asphalts, asphalt cutbacks, coal tar pitch; cracked, straight run, vacuum tower residuum, solvent precipitated, air blown or natural asphalts. Suitable asphalts have a penetration (1/10 mm.) of from 60 to 100 at 77° F.

The atactic propylene-ethylene copolymer is a by-product of the production of crystalline propylene-ethylene sequential block copolymer or propylene-ethylene terminal block copolymer. Such crystalline polymers can be prepared by initially contacting a first feed which can be propylene alone or propylene in admixture with a small quantity of ethylene, in solution in an inert hydrocarbon solvent with a catalyst system consisting of titanium trichloride, a dialkyl aluminum halide, and a glycol ether. After the polymerization has proceeded for a desired length of time, passage of the first feed to the reactor is discontinued, and a second feed, which may be ethylene, or a mixture of ethylene and propylene richer in ethylene than the first feed stream, is passed to the reactor, and polymerization is continued for a second period of time, after which the reaction is stopped by the addition of a polar material, such as an alcohol. Proceeding in this manner, a two-segment block polymer is produced, the first segment of which is polypropylene or a copolymer rich in propylene, and the second segment of which is polyethylene, or a copolymer richer in ethylene than the first segment. Alternately, the two feeds may be alternated two or more times, yielding a polymer having three or more segments of varying ethylene content. Such a process is described in Belgian Patent 538,782.

In carrying out block polymerization, the catalyst components are generally dissolved or suspended in an inert hydrocarbon solvent such as hexane, heptane, or octane, or mixtures thereof, in an appropriate reaction vessel equipped with means to agitate the contents thereof, in the absence of oxygen or moisture. The catalyst containing solvent is then usually brought to a temperature in the range of 25° C. to 150° C., preferably 60° C. to 80° C., and the olefin or mixture of olefins to be polymerized is then pressured into the reactor. Moderately elevated pressures, as from 20 p.s.i.g. to 500 p.s.i.g. are used in order to increase the amount of olefin dissolved in the solvent, and thus speed the reaction.

The aluminum component of the catalyst system may be any dialkyl aluminum halide, such as diethyl aluminum chloride, dipropyl aluminum chloride, dibutyl aluminum chloride or the corresponding bromine or iodine analogues, as well as dialkyl aluminum halides the ethyl radicals of which contain greater numbers of carbon atoms than those illustrated above. The glycol ether component of the catalyst may be any glycol ether, such as ethylene glycol dimethyl or diethyl ether, and corresponding di-ethers of diethylene glycol, triethylene glycol, or higher glycols.

In one known process for producing crystalline propylene-ethylene copolymers, the atactic (essentially non-crystalline) propylene-ethylene copolymer is formed during the stereo specific polymerization of propylene and ethylene. The atactic propylene-ethylene copolymer usually represents from about 5–15 wt. percent of the polymerization product, the remainder by an essentially crystalline propylene-ethylene copolymer. The polymer product is contacted with a solvent consisting of methanol and water to kill the catalyst. The catalyst is then removed in solution leaving a heptane slurry. The atactic propylene-ethylene copolymer is in solution in the heptane and this solution is removed from the isotactic (essentially crystalline) propylene-ethylene copolymer. The solution is distilled to recover the heptane solvent which is recycled. The solid material which remains is the atactic propylene-ethylene copolymer employed in the compositions of this invention. The solid atactic propylene-ethylene copolymers suitable for the compositions of the invention has a molecular weight in the range of 5,000–10,000 and a Brookfield melt viscosity in the range of 20,000–100,000 centipoise at 300° F. The atactic propylene-ethylene copolymer is soluble in boiling pentane, hexane, heptane, and other hydrocarbons. The atactic propylene-ethylene copolymers employed in the present invention are predominently polypropylene wth small amounts of ethylene, 0.5 to 20 wt. percent, in the propylene polymer chain. The present copolymers are readily distinguished from amorphous ethylene-propylene copolymers which usually have high polyethylene content. The atactic propylene-ethylene copolymer is essentially amorphous copolymer with minor amounts of stereoblock copolymer and isotactic copolymer.

Atactic polymers of the type employed herein are further characterized in La Chemia e F'lndustria 39, No. 4, pages 275–283 (1957) and Journal of Applied Polymer Science, vol. IV, No. 11, pages 219–224 (1960).

The elastomer component is any rubber compatible with asphalt and having a Mooney viscosity in the range of from 40 to 60. Such suitable elastomers include natural rubber, butadiene-styrene rubber, ethylene-propylene copolymers, neoprene, butyl rubber, polyisoprene, polybutadiene, polyisobutadiene, butadiene-acrylonitrile copolymers, chloroprene and the like. Such suitable elastomers generally have molecular weights in the range of 30,000–900,000.

Suitable petroleum mineral oils include aromatic, naphthenic and paraffinic oils containing from 0 to 100% aromatics and having a Saybolt Universal viscosity of 210° F. in the range of from 30 to 210 seconds and a flash point (COC) of at least 350° F.

In order to produce self-healing laminating adhesives meeting the requirements set forth in Table I while employing the components set forth herein, it is necessary that said components be present within the ranges indicated below:

Table II

| | Parts by weight |
|---|---|
| Asphalt | 82–70 |
| Atactic (essentially non-crystalline) propylene-ethylene copolymer | 1–10 |
| Elastomer | 8–14 |
| Petroleum mineral oil | 6–15 | provided that the total amount of atactic propylene-ethylene copolymer and elastomer is at least 10 parts by weight and preferably at least 12 parts by weight.

The hot metal laminating composition is prepared in the following manner: a 40–60 master batch of elastomer to asphalt is prepared in a Baker-Perkins mixer at a temperature in the range of 130–180° F. When this master batch is homogeneous, the atactic propylene-ethylene copolymer is added, then the remainder of the asphalt and finally the petroleum mineral oil are added. The mixture is heated to a temperature in the range of 230–280° F. and mixed for about one hour after the addition of the petroleum mineral oil or until the mixture is homogeneous.

The mixing may be carried out in any suitable manner. Any type of equipment which is suitable for blending viscous mixtures at the temperatures indicated may be employed or the temperatures themselves may be varied somewhat as well as the order of components so long as a homogeneous mixture is the final product.

In using the hot melt laminating composition of the invention for coating metal pipe, the hot laminate is applied to the outer surface of the metal pipe by extrusion, spraying, dipping, brushing or the like and the polymer sheet is extruded onto the hot laminate so that a tight strong bond is formed between the pipe and polymer sheet.

The asphalt employed in the Examples 1 through 5 had the following properties:

TABLE III

Asphalt

| | |
|---|---|
| R & B Softening Point ° F. | 105–120 |
| Penetration at 77° F. (1/10 mm.) | 70–90 |
| Penetration at 43° F. (1/10 mm.) | 15–20 |
| Flash (COC) ° F. min | 575 |
| Flash (SPM) ° F. min | 475 |
| Furol viscosity at 210° F. | 1,200–1,700 |
| Specific gravity at 60° F. | 1,015–1,030 |

The atactic propylene-ethylene copolymer employed in Examples 1 through 5 had a molecular weight (No. average molecular weight) of about 27,000 and a Brookfield viscosity of about 23,500 centipoise at 300° F.

The elastomer employed in Examples 1 through 5 is SBR 1500 which is a cold polymerized butadiene rubber with an average 23.5 percent styrene and Mooney viscosity of about 55.

The petroleum mineral oil employed in Examples 1 through 5 has the properties set out in Table IV.

TABLE IV

| | |
|---|---|
| Viscosity, SUS at 100° F. | 15,000 |
| Viscosity, SUS at 210° F. | 176 |
| API gravity at 60° F. | 11.8 |
| Specific gravity at 60° F. | 0.987 |
| Flash (COC) ° F. | 470 |
| Fire point ° F. | 540 |
| Molecular weight | 415 |
| Aniline point ° F. | 123 |
| Aromatics wt. percent | 81.5 |

For each of the components shown in Examples 1 through 4 of Table V, a 40–60 master batch of SBR asphalt was prepared in a Baker-Perkins mixer at 130–180° F. The atactic propylene-ethylene copolymer is added, then the remainder of the asphalt and finally the petroleum mineral oil is added. The mixture was then heated to 260° F. It was found necessary to blend each of the compositions for only one hour in order to achieve a homogeneous mixture after the addition of the oil.

Examples 1–5

The composition and properties of some asphalt based laminating compositions are set out in Table V. Example 5 is an asphalt control.

the spirit and scope of the invention. The examples provide the guidelines to indicate to those of skill in the art the means and manner of component selection and compounding.

TABLE V

|  | Example 1 | Example 2 | Example 3 | Example 4 | Example 5 |
|---|---|---|---|---|---|
| Asphalt (parts by wt.) | 76.5 | 77.5 | 83.0 | 79.1 | 100 |
| Atactic propylene-ethylene copolymer (parts by wt.) | 2.0 | 2.0 | 10.0 | 0 |  |
| SBR 1500 (parts by wt.) | 10.5 | 9.5 | 7.0 | 10.2 |  |
| Petroleum mineral oil (parts by wt.) | 11.0 | 11.0 | 0 | 10.7 |  |

| Physical properties | Required | Example 1 | Example 2 | Example 3 | Example 4 | Example 5 |
|---|---|---|---|---|---|---|
| R&B softening Pt. (° F.) | 140–180 | 157 | 151 | 171 | 131 | 106 |
| Pen., 77° F. (1/10 mm.) | 90–120 | 105 | 100 | 51 | 114 | 110 |
| Cold flow [1] (in./hr.) | 0–3/16 | 1/16 | 3/16 | 0 | 3/16 | 3/16 |
| 160° F. flow [1] (in./hr.) | 0–3 | 1½ | 2⅔ | 1⅛ | 4½ | 12+ |
| Stormer viscosity: |  |  |  |  |  |  |
| 300° F. 100 rev. (sec.) | 65–140 | 123 | 89 | 94 | 93 | 9 |
| 270° F. 100 rev. (sec.) | 180–380 | 252 | 186 | 150 | 210 | 10 |

[1] Corrugated brass plate at 45° angle.

Example 5 which contains only asphalt fails to meet four of the required physical properties. Example 4 which contains no atactic propylene-ethylene copolymer fails two of the required physical properties. Comparison of Example 4 with Examples 1 and 2 shows the importance of atactic propylene-ethylene copolymer to reduce hot flow.

Example 3 contains too small an amount of elastomer and thus fails viscosity requirements. Example 3 also shows that the elimination of petroleum mineral oil from the composition yields a product which is too low in penetration value. Example 2 which has 11.5 parts by weight total elastomer and atactic propylene-ethylene copolymer is less desirable in hot flow properties than is Example 1 which has 12.5 parts by weight total elastomer and copolymer; however, Example 2 is significantly better in hot flow properties than Example 4.

It can be seen from the data in Table IV that a suitable composition must contain at least 10 parts by weight of a combination of elastomer and atactic propylene-ethylene copolymer, at least 1 part by weight atactic propylene-ethylene copolymer and at least 8 parts by weight elastomer.

The examples presented herein are intended to be merely illustrative and are not intended to limit the scope of the claims. Certain ranges of components have been specified, and it is to be understood that those of skill in the art will be able to select the respective proportion from each range so as to produce compositions within

The invention claimed is:

1. A hot melt laminating composition comprising 70 to 82 parts by weight of asphalt having a penetration at 77° F. in the range of from 60–100, 1 to 10 parts by weight of atactic propylene-ethylene copolymer containing 0.5 to 20 weight percent ethylene, having a Brookfield viscosity in the range of from 20,000 to 100,000 centipoise at 300° F., and a molecular weight in the range of from 5,000 to 100,000, 8 to 14 parts by weight of asphalt compatible elastomer having a Mooney viscosity in the range of from 40–60 and 6 to 15 parts by weight of petroleum mineral oil having a Saybolt Universal viscosity at 210° F. in the range of from 30 to 210 seconds and a flash point of at least 350° F.

2. A hot melt laminating composition according to claim 1 wherein the total amount of atactic propylene-ethylene copolymer and elastomer is at least 12 parts by weight.

References Cited

UNITED STATES PATENTS

| 3,312,157 | 4/1967 | Coscia. |
| 2,918,940 | 12/1959 | Carr. |
| 3,154,508 | 10/1964 | Clelland. |
| 3,144,424 | 8/1964 | Clelland. |
| 3,144,423 | 8/1964 | Belak. |
| 2,996,467 | 8/1961 | Hawley. |

ALLAN LIEBERMAN, Primary Examiner

P. R. MICHL, Assistant Examiner

U.S. Cl. X.R.

117—94, 135; 156—334; 161—224